US012645794B2

(12) United States Patent
Zhang et al.

(10) Patent No.: US 12,645,794 B2
(45) Date of Patent: Jun. 2, 2026

(54) METHOD, ELECTRONIC DEVICE, AND COMPUTER PROGRAM PRODUCT FOR SNAPSHOT CLASSIFICATION

(71) Applicant: Dell Products L.P., Round Rock, TX (US)

(72) Inventors: Weibing Zhang, Beijing (CN); Victor Lei Gao, Beijing (CN); Hao Fang, Beijing (CN); Donglei Wang, Beijing (CN); Zhe He, Beijing (CN)

(73) Assignee: Dell Products L.P., Round Rock, TX (US)

( * ) Notice: Subject to any disclaimer, the term of this patent is extended or adjusted under 35 U.S.C. 154(b) by 573 days.

(21) Appl. No.: 18/128,442

(22) Filed: Mar. 30, 2023

(65) Prior Publication Data

US 2024/0095358 A1 Mar. 21, 2024

(30) Foreign Application Priority Data

Sep. 16, 2022 (CN) .......................... 202211132018.8

(51) Int. Cl.
*G06F 21/55* (2013.01)
*G06F 21/56* (2013.01)
(52) U.S. Cl.
CPC .......... *G06F 21/564* (2013.01); *G06F 21/554* (2013.01)
(58) Field of Classification Search
CPC .. G06F 21/564; G06F 21/554; G06F 11/1469; G06F 2201/84; G06F 11/1458; G06F 21/568; G06F 21/78; G06F 11/1446; G06F 21/56; G06F 21/1082; H04L 67/1095; H04L 41/5064; H04L 41/0863
See application file for complete search history.

(56) References Cited

U.S. PATENT DOCUMENTS

| | | | | |
|---|---|---|---|---|
| 11,055,405 | B1 * | 7/2021 | Jin | G06F 21/552 |
| 11,275,656 | B2 * | 3/2022 | Martin | G06N 3/092 |
| 11,770,398 | B1 | 9/2023 | Erlingsson et al. | |
| 11,792,284 | B1 | 10/2023 | Nanduri et al. | |
| 11,818,156 | B1 | 11/2023 | Parikh et al. | |
| 2015/0149411 | A1 * | 5/2015 | Plisko | G06F 16/178 |
| | | | | 707/639 |
| 2020/0137084 | A1 * | 4/2020 | Roy | H04L 63/0236 |
| 2022/0100378 | A1 * | 3/2022 | Borate | G06F 21/568 |
| 2022/0156396 | A1 | 5/2022 | Bednash et al. | |
| 2022/0200869 | A1 | 6/2022 | Erlingsson et al. | |
| 2022/0215101 | A1 | 7/2022 | Rioux et al. | |
| 2022/0229805 | A1 | 7/2022 | Chakeres et al. | |
| 2022/0232024 | A1 | 7/2022 | Kapoor et al. | |
| 2022/0232025 | A1 | 7/2022 | Kapoor et al. | |

(Continued)

*Primary Examiner* — Ali S Abyaneh
(74) *Attorney, Agent, or Firm* — BainwoodHuang

(57) ABSTRACT

Techniques for snapshot classification involve generating a plurality of snapshots of a storage system at multiple times; clustering the plurality of snapshots into a first group of snapshots and a second group of snapshots based on data features of the plurality of snapshots; and determining a clean snapshot among the plurality of snapshots based on a comparison between the generation time of the first group of snapshots and the generation time of the second group of snapshots. Accordingly, a clean snapshot and a damaged snapshot can be automatically and quickly distinguished, thereby improving the efficiency of finding a clean snapshot and helping a user recover data quickly.

20 Claims, 5 Drawing Sheets

(56) References Cited

U.S. PATENT DOCUMENTS

| | | | |
|---|---|---|---|
| 2022/0247769 A1 | 8/2022 | Erlingsson et al. | |
| 2022/0294816 A1 | 9/2022 | Martin et al. | |
| 2022/0311794 A1 | 9/2022 | Maya et al. | |
| 2022/0329616 A1 | 10/2022 | O'Hearn et al. | |
| 2022/0360600 A1 | 11/2022 | Reed et al. | |
| 2022/0400130 A1 | 12/2022 | Kapoor et al. | |
| 2023/0032686 A1 | 2/2023 | Williams et al. | |
| 2023/0075355 A1 | 3/2023 | Twigg et al. | |
| 2023/0095870 A1 | 3/2023 | Du et al. | |
| 2023/0128602 A1* | 4/2023 | Park | G06F 16/2358 |
| | | | 714/6.3 |
| 2023/0254330 A1 | 8/2023 | Kumar et al. | |
| 2023/0275917 A1 | 8/2023 | Karmali et al. | |
| 2023/0306108 A1 | 9/2023 | Veprinsky et al. | |
| 2023/0319092 A1 | 10/2023 | Zeng et al. | |
| 2023/0328086 A1 | 10/2023 | Kapoor et al. | |
| 2025/0258918 A1* | 8/2025 | Sun | G06F 21/552 |

* cited by examiner

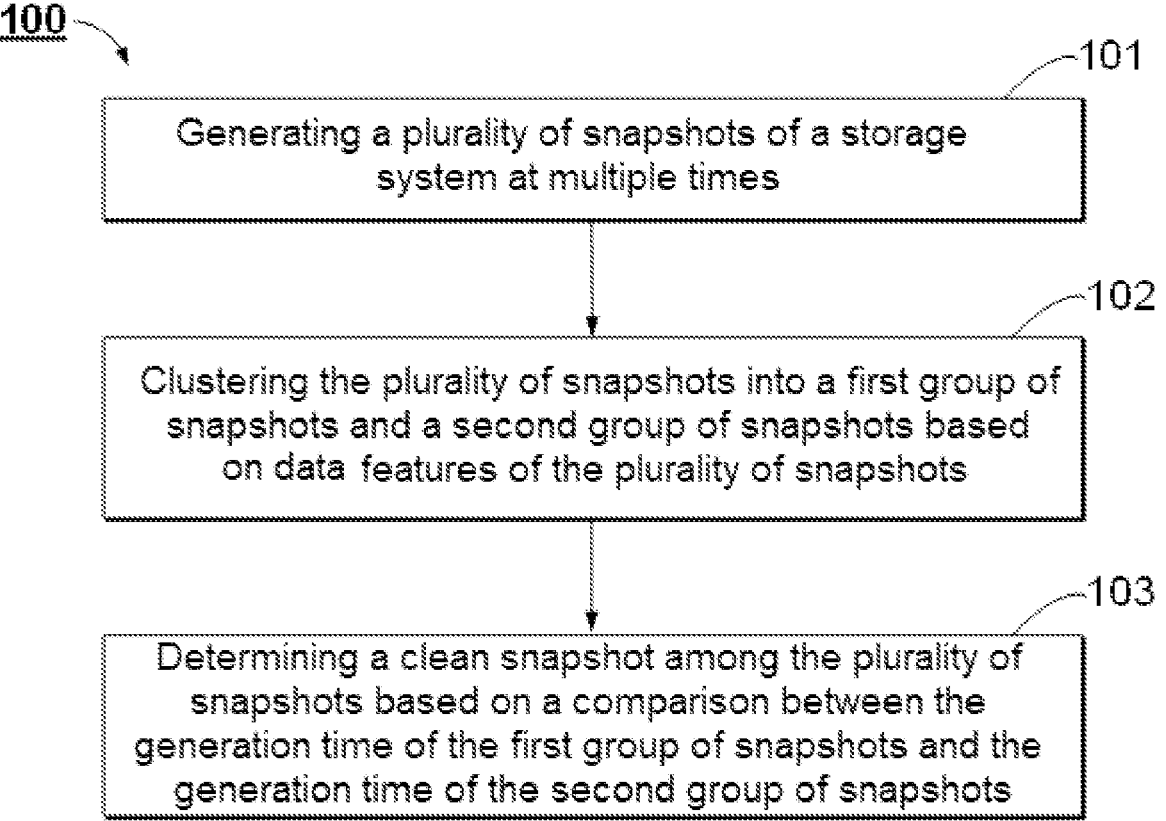

100

101

Generating a plurality of snapshots of a storage
system at multiple times

102

Clustering the plurality of snapshots into a first group of
snapshots and a second group of snapshots based
on data features of the plurality of snapshots

103

Determining a clean snapshot among the plurality of
snapshots based on a comparison between the
generation time of the first group of snapshots and the
generation time of the second group of snapshots

FIG. 1

METHOD, ELECTRONIC DEVICE, AND COMPUTER PROGRAM PRODUCT FOR SNAPSHOT CLASSIFICATION

CROSS-REFERENCE TO RELATED APPLICATION

This application claims priority to Chinese Patent Application No. CN202211132018.8, on file at the China National Intellectual Property Administration (CNIPA), having a filing date of Sep. 16, 2022, and having "METHODS, DEVICES, AND COMPUTER PROGRAM PRODUCTS FOR SNAPSHOTS CLASSIFICATION" as a title, the contents and teachings of which are herein incorporated by reference in their entirety.

TECHNICAL FIELD

Embodiments of the present disclosure relate to the technical field of computers, and in particular to a method, an electronic device, and a computer program product for snapshot classification.

BACKGROUND

With the development and popularization of networks, network security has become more and more important. Users may be exposed to various malicious network attacks, such as ransomware. Ransomware is a type of malicious extortion software that prevents users from accessing files, systems, or networks, until a ransom is paid. Malware attacks may lead to interruption of important operations or loss of critical information and data, causing serious impacts and bringing major threats to security of user data.

SUMMARY OF THE INVENTION

According to an example embodiment of the present disclosure, a technical solution of snapshot classification is provided for quickly distinguishing a clean snapshot from a damaged snapshot.

In a first aspect of the present disclosure, a method is provided, and the method may include: generating a plurality of snapshots of a storage system at multiple times; clustering the plurality of snapshots into a first group of snapshots and a second group of snapshots based on data features of the plurality of snapshots; and determining a clean snapshot among the plurality of snapshots based on a comparison between the generation time of the first group of snapshots and the generation time of the second group of snapshots.

By implementing this method provided in the first aspect, a clean snapshot and a damaged snapshot can be automatically and quickly distinguished, thereby improving the efficiency of finding a clean snapshot and helping a user recover data quickly.

In some embodiments of the first aspect, the method further includes: acquiring a plurality of data patterns; and determining the data features of the snapshots based on the snapshots and the plurality of data patterns.

In some embodiments of the first aspect, the data patterns are binary bytes of a predetermined length.

In some embodiments of the first aspect, the plurality of data patterns include a first data pattern, a count value of the first data pattern of a first snapshot in the first group of snapshots is greater than a count value of the first data pattern of a second snapshot in the second group of snapshots, the first snapshot is a clean snapshot, and the second snapshot is a damaged snapshot.

In some embodiments of the first aspect, in response to generation of the snapshots, the number of each data pattern in the plurality of data patterns in the snapshots is counted; and the data features of the snapshots are determined according to the counts of the plurality of data patterns of the snapshots obtained by the counting.

In some embodiments of the first aspect, the method further includes: taking a snapshot with the latest generation time in the first group of snapshots as a target snapshot; and according to the target snapshot, recovering the storage system to a state corresponding to the target snapshot.

In some embodiments of the first aspect, the method further includes: based on the average generation time of the first group of snapshots being earlier than the average generation time of the second group of snapshots, determining that the first group of snapshots are clean snapshots and the second group of snapshots are damaged snapshots; or based on a median value of the generation time of the first group of snapshots being earlier than a median value of the generation time of the second group of snapshots, determining that the first group of snapshots are clean snapshots and the second group of snapshots are damaged snapshots.

In some embodiments of the first aspect, the clean snapshots are snapshots of the storage system that have not been subjected to a malware attack, and the damaged snapshots are snapshots of the storage system that have been subjected to a malware attack.

In some embodiments of the first aspect, the method further includes: performing the classification on the plurality of snapshots in response to detecting the malware attack.

In some embodiments of the first aspect, the method further includes: randomly selecting feature values of data features of two of the snapshots as a first centroid of a first cluster and a second centroid of a second cluster; performing a cyclic process until a preset condition is met, the cyclic process including: calculating distances between feature values of data features of other snapshots and the first centroid and the second centroid; for each data feature in the data features of the other snapshots, selecting a cluster corresponding to the centroid with a small distance for clustering; calculating an average value of feature values of various data features in the first cluster obtained by clustering and an average value of feature values of various data features in the second cluster obtained by clustering; and updating the first centroid to the average value of feature values of various data features in the first cluster obtained by clustering, and updating the second centroid to the average value of feature values of various data features in the second cluster obtained by clustering; wherein the preset condition is that the first centroid is the same as the average value of feature values of various data features in the first cluster, and the second centroid is the same as the average value of feature values of various data features in the second cluster; and then taking snapshots corresponding to the data features in the first cluster that meet the preset condition as the first group of snapshots, and taking snapshots corresponding to the data features in the second cluster that meet the preset condition as the second group of snapshots.

In a second aspect of the present disclosure, an electronic device is provided. The electronic device includes: a processor; and a memory coupled to the processor and having instructions stored therein, where the instructions, when executed by the electronic device, cause the electronic device to perform operations including: generating a plurality of snapshots of a storage system at multiple times;

clustering the plurality of snapshots into a first group of snapshots and a second group of snapshots based on data features of the plurality of snapshots; and determining a clean snapshot among the plurality of snapshots based on a comparison between the generation time of the first group of snapshots and the generation time of the second group of snapshots.

By implementing the electronic device provided in the second aspect, a clean snapshot and a damaged snapshot can be automatically and quickly distinguished, thereby improving the efficiency of finding a clean snapshot and helping a user recover data quickly.

In some embodiments of the second aspect, the operations further include: acquiring a plurality of data patterns; and determining the data features of the snapshots based on the snapshots and the plurality of data patterns.

In some embodiments of the second aspect, the data patterns are binary bytes of a predetermined length.

In some embodiments of the second aspect, the plurality of data patterns include a first data pattern, a count value of the first data pattern of a first snapshot in the first group of snapshots is greater than a count value of the first data pattern of a second snapshot in the second group of snapshots, the first snapshot is a clean snapshot, and the second snapshot is a damaged snapshot.

In some embodiments of the second aspect, in response to generation of the snapshots, the number of each data pattern in the plurality of data patterns in the snapshots is counted; and the data features of the snapshots are determined according to the counts of the plurality of data patterns of the snapshots obtained by the counting.

In some embodiments of the second aspect, the operations further include: taking a snapshot with the latest generation time in the first group of snapshots as a target snapshot; and according to the target snapshot, recovering the storage system to a state corresponding to the target snapshot.

In some embodiments of the second aspect, based on the average generation time of the first group of snapshots being earlier than the average generation time of the second group of snapshots, it is determined that the first group of snapshots are clean snapshots and the second group of snapshots are damaged snapshots. Or, based on a median value of the generation time of the first group of snapshots being earlier than a median value of the generation time of the second group of snapshots, it is determined that the first group of snapshots are clean snapshots and the second group of snapshots are damaged snapshots.

In some embodiments of the second aspect, the clean snapshots are snapshots of the storage system that have not been subjected to a malware attack, and the damaged snapshots are snapshots of the storage system that have been subjected to a malware attack.

In some embodiments of the second aspect, the plurality of snapshots are classified in response to detecting the malware attack.

In some embodiments of the second aspect, the operations further include: randomly selecting feature values of data features of two of the snapshots as a first centroid of a first cluster and a second centroid of a second cluster; performing a cyclic process until a preset condition is met, the cyclic process including: calculating distances between feature values of data features of other snapshots and the first centroid and the second centroid; for each data feature in the data features of the other snapshots, selecting a cluster corresponding to the centroid with a small distance for clustering; calculating an average value of feature values of various data features in the first cluster obtained by clustering and an average value of feature values of various data features in the second cluster obtained by clustering; and updating the first centroid to the average value of feature values of various data features in the first cluster obtained by clustering, and updating the second centroid to the average value of feature values of various data features in the second cluster obtained by clustering; wherein the preset condition is that the first centroid is the same as the average value of feature values of various data features in the first cluster, and the second centroid is the same as the average value of feature values of various data features in the second cluster; and then taking snapshots corresponding to the data features in the first cluster that meet the preset condition as the first group of snapshots, and taking snapshots corresponding to the data features in the second cluster that meet the preset condition as the second group of snapshots.

In a third aspect of the present disclosure, a computer program product is provided, the computer program product is tangibly stored in a computer-readable medium and includes machine-executable instructions, wherein the machine-executable instructions, when executed, cause a machine to perform the method according to the first aspect of the present disclosure.

In a fourth aspect of the present disclosure, a computer-readable storage medium having a computer program stored thereon is provided, wherein the computer program, when executed by a device, causes the device to perform the method according to the first aspect of the present disclosure.

As can be seen from the above description, by the solution according to various embodiments of the present disclosure, a clean snapshot and a damaged snapshot can be automatically and quickly distinguished, thereby improving the efficiency of finding a clean snapshot and helping a user recover data quickly.

It should be understood that the Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which:

FIG. 1 shows a flow chart of a method for snapshot classification according to some embodiments of the present disclosure;

DETAILED DESCRIPTION

Figure 2:
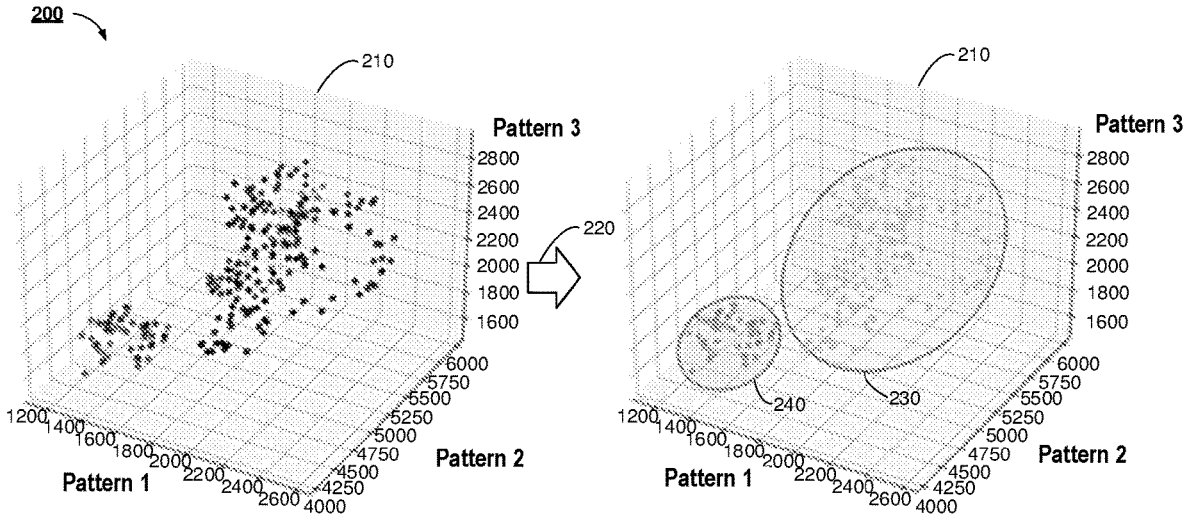
FIG. 2 shows a schematic diagram of an example of clustering according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Malware attacks pose a major threat to security of user data. For example, because data storage services host important files for a user, they are often the target of ransomware attacks. Ransomware will replace files on a compromised device with a key-encrypted version controlled by an attacker. Once ransomware finishes encrypting and replacing the user files, it can prevent the user from accessing normal data until a ransom is paid. Since activities of ransomware generally include routine operations such as reading, writing, creating, and deleting files, it is difficult for a storage system to distinguish between ransomware and itself through behaviors, and thus it cannot detect in time that it has been attacked. In addition, data written by ransomware is generally encrypted data. Since the encrypted data content is random, conventional antivirus methods usually cannot effectively detect data modification and cannot assist in data recovery.

Storage snapshot is a set of reference marks for data at a specific point in time, and can be defined as a set of pointers for representing an accessible copy of data stored on a storage device that provides the user with a rollback to the specific point in time. The storage device may be a disk drive, a tape, a storage area network (SAN), or the like. A snapshot can be considered as a directory, with each pointer describing information or data stored on a disk. A computer may treat this snapshot as a full backup of data. In some examples, a snapshot can save the current directory and states of its subtrees of a file system. Creation of a snapshot is equivalent to backing up each inode in a directory tree (subtree below a node), because the inode carries full information about the file system. A snapshot typically has a small amount of data and takes up a small storage space.

A snapshot can be used to reduce the threat posed by ransomware. If a user has a "clean" snapshot from a previous time point that is not affected by ransomware encryption, a rollback to a clean snapshot state can be performed to eliminate the ransomware threat.

In some implementations, data can be protected by scheduling snapshots. When the storage system is attacked by malware, normal files and folders are replaced by ransomware with encrypted content. If the attack is not detected in time, encrypted data will be taken into the snapshots. When the attack is discovered, the user can select a snapshot at an unattacked time point to perform a rollback to quickly restore normal data access. It would be tedious and time-consuming to have the user manually install from newest to oldest and check each snapshot to determine which ones are clean and perform a rollback.

Embodiments of the present disclosure provide a method and an electronic device for snapshot classification for quickly distinguishing a clean snapshot from a damaged snapshot. The method may include: generating a plurality of snapshots of a storage system at multiple times; clustering the plurality of snapshots into a first group of snapshots and a second group of snapshots based on data features of the plurality of snapshots; and determining a clean snapshot among the plurality of snapshots based on a comparison between the generation time of the first group of snapshots and the generation time of the second group of snapshots.

By implementing this embodiment of the present disclosure, a clean snapshot and a damaged snapshot can be automatically and quickly distinguished, thereby improving the efficiency of finding a clean snapshot and helping a user recover data quickly.

FIG. 1 shows a flow chart of snapshot classification method 100 according to some embodiments of the present disclosure, where a clean snapshot can be quickly distinguished from a damaged snapshot by method 100. Method 100 may be applied to an electronic device with a storage system, such as a personal computer (PC), a computer cluster, and a server. The embodiments of the present disclosure do not make any limitation to the device type and the like of the electronic device that implements method 100. It should be understood that, in the embodiments of the present disclosure, the subject implementing method 100 may be implemented by an entity device or may be implemented by a plurality of entity devices together. It is understandable that the subject implementing method 100 may be a logical function module in an entity device, or may be a logical function module composed of a plurality of entity devices. It should be understood that, in the following embodiments of the present disclosure, the steps in the method provided in the embodiments of the present disclosure may be performed by one entity device, or the steps in the method provided in the embodiments of the present disclosure may be performed by a plurality of entity devices cooperatively, which is not limited in the embodiments of the present disclosure. It should be understood that method 100 may further include additional blocks that are not shown and/or may omit blocks that are shown, and the scope of the present disclosure is not limited in this regard.

At block 101, a plurality of snapshots of a storage system are generated at multiple times. In some examples, automatic creation of a snapshot can be set to be performed at a specific time or at a specific frequency. For example, a snapshot is created every 12 hours based on the current state of a storage object, which facilitates data protection with an automatic snapshot scheduling policy.

At block 102, the plurality of snapshots are clustered into a first group of snapshots and a second group of snapshots based on data features of the plurality of snapshots. In some embodiments, changes in data features caused by ransomware attacks can be identified based on data sampling, data statistics, and machine learning, so that the storage system can quickly and effectively find out a clean snapshot during ransomware attack recovery. Based on the clean snapshot, it is possible to help a user rapidly recover from detected ransomware attacks, without manually checking by the user to find the clean snapshot. In some embodiments, counts of data patterns, deduplicated data block size, deduplication rate, deduplication set size, compression rate, or other measures of entropy may be used as data features to help identify whether a malicious attack has occurred. A relatively obvious entropy change will occur after a malicious attack.

At block 103, a clean snapshot among the plurality of snapshots is determined based on a comparison between the generation time of the first group of snapshots and the generation time of the second group of snapshots. In some embodiments of the present disclosure, a clean snapshot with an earlier time identifier may be determined according to time identifiers such as the average generation time, a median value of the generation time, or a comparison between the time periods of two groups of snapshots. For example, based on the average generation time of the first group of snapshots being earlier than the average generation time of the second group of snapshots, it is determined that the first group of snapshots are clean snapshots and the second group of snapshots are damaged snapshots. Or, based on a median value of the generation time of the first group of snapshots being earlier than a median value of the generation time of the second group of snapshots, it is determined that the first group of snapshots are clean snapshots and the second group of snapshots are damaged snapshots. Herein, the clean snapshots are snapshots of the storage system that have not been subjected to a malware attack, and the damaged snapshots are snapshots of the storage system that have been subjected to a malware attack.

By implementing method 100, a clean snapshot and a damaged snapshot can be automatically and quickly distinguished, thereby improving the efficiency of finding a clean snapshot and helping the user recover data quickly.

In some embodiments of the present disclosure, after the first group of snapshots is identified as a set of clean snapshots, a certain snapshot in the first group of snapshots (e.g., a snapshot with the latest generation time or a snapshot at a certain moment manually selected by the user) may be taken as a target snapshot, and the storage system is recovered to a storage state corresponding to the target snapshot according to the target snapshot. In some embodiments, after a rollback to a clean target snapshot state, the user can normally access original non-encrypted data, and then the user can use antivirus software to discover and remove malware from the system.

Various embodiments of the present disclosure are generally applicable to storage systems that support inline pattern detection (ILPD), and may also be applicable to other storage objects with data sampling and data statistical functions, such as file systems, logical storage units, and directories. Through data sampling and statistics of a storage object, data features of the storage object can be determined.

In some embodiments of the present disclosure, the inline pattern detection function is a function used in some storage systems to reduce data, including recognizing a set of static predefined patterns when they are written to a storage object. A plurality of data patterns that are predefined constitute a data set for pattern detection. Inline pattern detection helps the system save storage space, and a data saving ratio depends on the percentage of pattern data in different datasets. For example, if it is detected that a read-write stream contains predefined data patterns, then there is no need to write data of these patterns to a disk space, but only metadata is updated for the data patterns. That is, the content of the data patterns only needs to be stored in one copy, and the location is recorded if a repeated data pattern appears. When the system commits a metadata change, detected data patterns will be translated into special metadata in an indirect block, and the special metadata will be used as a map pointer indicator. These metadata can be read through a subsequent reading operation, and the pattern content is returned using buffer cache. A dataset for pattern detection may contain more data patterns for achieving a better data retention ratio. The more recurring data patterns are detected, the more storage space can be saved.

In some embodiments, the detected and counted data patterns may be an expression pattern of a series of predefined data blocks. In some embodiments, the data patterns are binary bytes of a predetermined length. For example, inline pattern detection of repeatable data with a length of 8 bytes is supported in the storage system. One example pattern is an 8-byte data block with bit values being all 0, and another example pattern is an 8-byte data block with bit values being all 1. It is not limited to blocks of all 0 or all 1. There can be thousands of predefined data patterns. The embodiments of the present disclosure do not limit the form and number of the data patterns.

In some embodiments of the present disclosure, data features of the snapshots may also be determined based on the snapshots and the plurality of predefined data patterns. In some examples, in response to generation of the snapshots, the content in the snapshots is matched with the predefined data patterns, and the number of each of the plurality of data patterns in the snapshots is counted by using a counter in an inline pattern detection module. For example, each time an aligned data pattern is submitted, the count of this data pattern is incremented by one, and each time a data pattern is removed, the count is decremented by one. The data features of the snapshots are determined according to the counts of the plurality of data patterns of the snapshots obtained by the counting.

In one example implementation, the data feature of each snapshot of the storage object may be represented by a multi-dimensional vector v represented by a plurality of data patterns. For example, for a data feature vector $v=(c_1, c_2, \ldots, c_n)$ that includes n different data patterns, c therein represents the count value for each unique data pattern. For each snapshot i, the data feature vector $v_i=(c_{i1}, c_{i2}, \ldots, c_{1n})$.

In some embodiments of the present disclosure, after the data feature vectors of the plurality of snapshots are acquired, a clustering algorithm may be used to classify the snapshots. Clustering is a technique for dividing multiple pieces of data into multiple groups or clusters. A group or cluster is broadly defined as a set of data objects that are more similar to other data objects in the group or cluster than to data objects in other groups or clusters. That is, data objects with similar data features are clustered into a group or cluster. For a series of snapshots of an object attacked by ransomware, performing clustering can quickly help classify the plurality of snapshots into a group of damaged snapshots and a group of clean snapshots. A possible boundary between clean and damaged snapshots can be found based on a clustering result, and the user can then quickly locate latest clean snapshots around the boundary with a small number of manual checks.

The clustering algorithm used in the embodiments of the present disclosure may include, but is not limited to, K-means (K-means) algorithm, density-based spatial clustering algorithm, hierarchical clustering algorithm, spectral clustering algorithm, and the like. The scope of the embodiments of the present disclosure is not limited thereto.

In some example embodiments, a clustering into K clusters may be performed using the K-means clustering algorithm on the data feature vectors of the plurality of snapshots. This clustering process can be performed anywhere, regardless of whether on the storage system or on any other computing device where feature vectors of data are available. In some examples, the counter of data patterns for the plurality of snapshots may also be sent from a storage server to other devices to perform an off-array check.

In some embodiments of the present disclosure, the process of the K-means clustering algorithm may include: specifying a K value indicating the number of clusters to be obtained through division, for example, K being 2; randomly selecting feature values of data features of two of the snapshots as a first centroid of a first cluster and a second centroid of a second cluster; performing a cyclic process S1-S4 until a preset condition is met, the cyclic process including: S1: calculating distances between feature values of data features of other snapshots and the first centroid and the second centroid; S2: for each data feature in the data features of the other snapshots, selecting a cluster corresponding to the centroid with a small distance for clustering; S3: calculating an average value of feature values of various data features in the first cluster obtained by clustering and an average value of feature values of various data features in the second cluster obtained by clustering; and S4: updating the first centroid to the average value of feature values of various data features in the first cluster obtained by clustering, and updating the second centroid to the average value of feature values of various data features in the second cluster obtained by clustering; wherein the preset condition is that the first centroid is the same as the average value of feature values of various data features in the first cluster, and the second centroid is the same as the average value of feature values of various data features in the second cluster; and then taking snapshots corresponding to the data features in the first cluster that meet the preset condition as the first group of snapshots, and taking snapshots corresponding to the data features in the second cluster that meet the preset condition as the second group of snapshots.

FIG. 2 shows a schematic diagram of an example of clustering 200 according to some embodiments of the present disclosure. In the example of FIG. 2, three data patterns (pattern 1, pattern 2, pattern 3) are used to constitute a data feature vector of a snapshot. As shown in FIG. 2, clustering with k=2 can be performed using the K-means clustering algorithm on data feature vectors of a plurality of snapshots. The plurality of data feature vectors in three-dimensional coordinate space 210 are subjected to clustering process 220 and are finally divided into two clusters. In one example, first cluster 230 is considered a group of clean snapshots and second cluster 240 is considered a group of damaged snapshots. This is because when malware encrypts a file and replaces the original file, data is turned into high-entropy data. A suspicious result of a malware attack could be a reduction in the count of a plurality of data patterns in a file system and a change in the distribution of the data patterns.

In some embodiments of the present disclosure, the plurality of data patterns include a first data pattern (e.g., pattern 1), and a count value of the first data pattern of a first snapshot in the first group of snapshots (e.g., first cluster 230) is greater than a count value of the first data pattern of a second snapshot in the second group of snapshots (e.g., second cluster 240), where the first snapshot is a clean snapshot and the second snapshot is a damaged snapshot.

In some embodiments of the present disclosure, when the system detects that the data patterns of the snapshots are changed by a malware attack, it triggers clustering of data features of the plurality of snapshots to help quickly distinguish clean snapshots from damaged snapshots.

In an example of the present disclosure, a snapshot of the storage system is generated every hour; after 72 snapshots are obtained, the storage system is attacked by malware, and after 24 snapshots are continued to be captured, data feature vectors of all the snapshots are subjected to clustering, with a clustering result indicating that the first 72 snapshots on a timeline are classified in one cluster, and the last 24 snapshots are classified in another cluster. In this way, the 72nd snapshot at the time boundary of the two clusters will be a good candidate snapshot for the user to check a clean snapshot. The ways for the user to manually check a snapshot may include detecting the integrity of a file, detecting a hash value of the file, or the like, which is not limited in he this embodiment.

Figure 3:
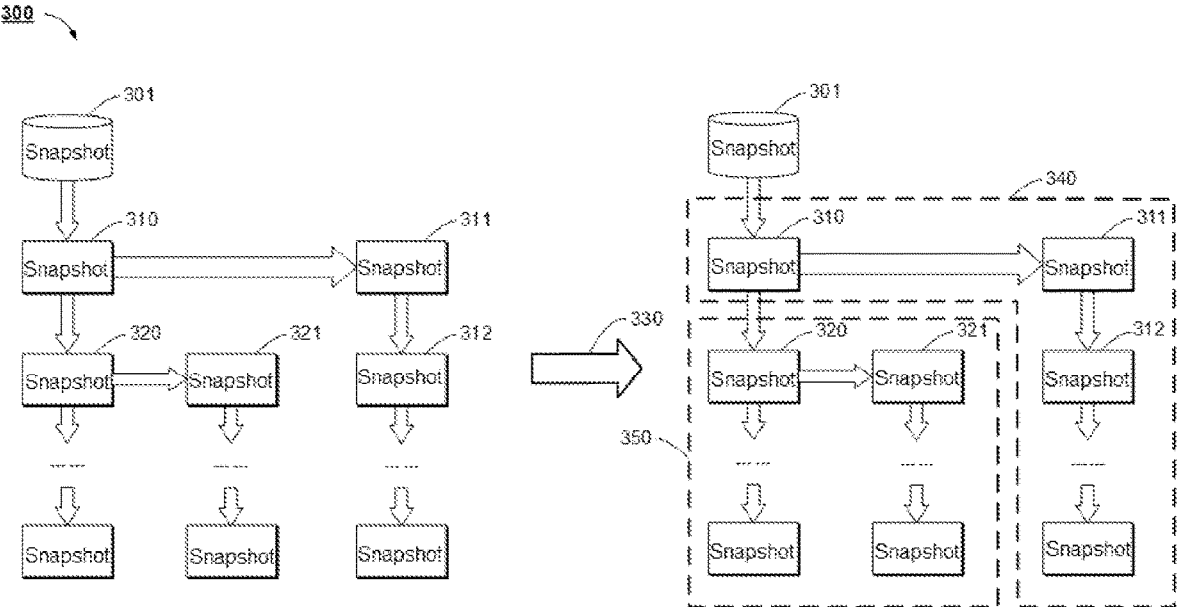
FIG. 3 shows a schematic diagram of an example of classification according to some embodiments of the present disclosure.

FIG. 3 shows a schematic diagram of an example of classification 300 according to some embodiments of the present disclosure. A snapshot is generated for storage object 301, and creation of a new snapshot generally refers to an incremental modification performed based on a previous snapshot. As shown in FIG. 3, snapshot 311 and snapshot 320 are generated based on snapshot 310, snapshot 312 is generated based on snapshot 311, snapshot 321 is generated based on snapshot 320, and so on. After a plurality of snapshots of storage object 301 are subjected to clustering 330, a group of clean snapshots 340 and a group of damaged snapshots 350 can be distinguished from each other. It can be seen in FIG. 3 that snapshot 320 is a damaged snapshot, and snapshots generated after snapshot 320 are all damaged snapshots. The previous snapshot 310 of snapshot 320 is a clean snapshot, so when snapshot 320 is a damaged snapshot, a rollback to a system state of the previous clean snapshot 310 of snapshot 320 can be chosen.

It can be understood that when malware encrypts a file and replaces the original file, it turns data into high-entropy data, which is often indistinguishable from a random stream that erases patterns in original data. Therefore, the method for snapshot classification in some embodiments of the present disclosure may not be applicable to a file system where most files are frequently deleted and repopulated with new data. In fact, in such file system, snapshots cannot provide much help to protect data, and malware may not be a big threat either, since the files in the file system may be quickly deleted. In addition, it can be understood that for a storage system with few data patterns, such as a shared folder including all compressed files, the method for snapshot classification in some embodiments of the present disclosure may not be applicable.

It can be understood that, in some embodiments of the present disclosure, in order to improve the accuracy of determining a clean snapshot, other file integrity checking methods, such as file name checking, file magic header checking, and file content checking, may be used in combination to check the integrity of a file, and a rollback is performed after a clean snapshot is found.

By implementing the forgoing embodiments of the present disclosure and their combinations, snapshots that are not affected by malware can be quickly located. Based on data read and write sampling and statistic for the plurality of snapshots of the storage system (such as using the inline pattern detection function) and performing of a machine learning algorithm (such as a clustering algorithm), by classifying the counts of data patterns of the plurality of snapshots, a boundary of clean snapshots unaffected by malware can be quickly and automatically located after the malware attack. This can help the user quickly find the boundary between clean snapshots and damaged snapshots, enabling the user to find the latest clean snapshot with a small number of manual checks, allowing a faster recovery from the malware attack, and reducing the possibility of inaccessible data.

Figure 4:
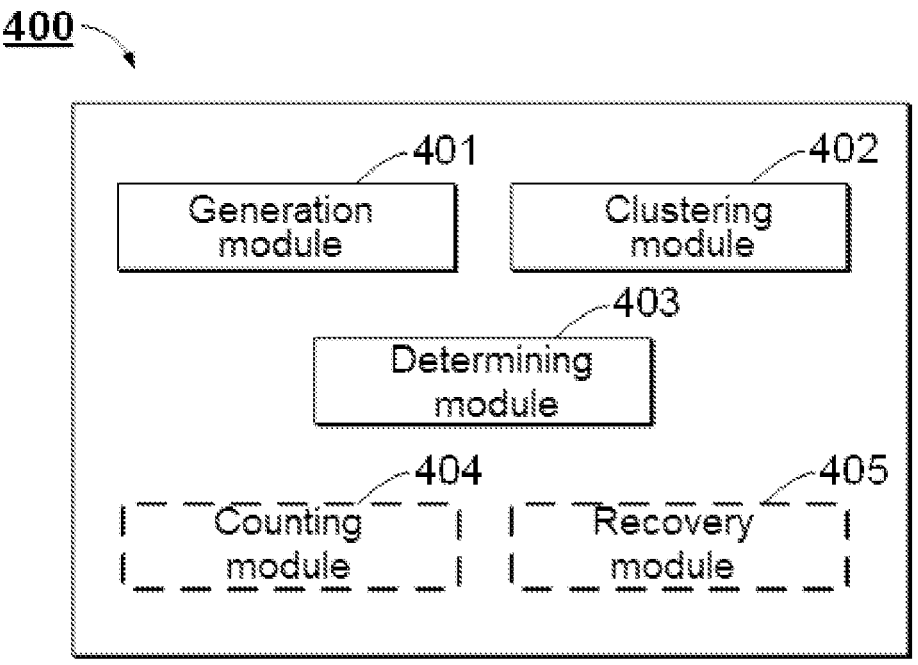
FIG. 4 shows a schematic diagram of functional modules of a system according to some embodiments of the present disclosure.

FIG. 4 shows a schematic diagram of functional modules of storage system 400 according to an embodiment of the present disclosure. In the embodiment of the present application, storage system 400 may be divided into functional modules. For example, various functions of storage system 400 may be divided into various functional modules, or two or more functions of storage system 400 may be integrated into one functional module, which is not limited in this embodiment. Storage system 400 may include generation module 401, clustering module 402, determining module 403, and the like. The various functional modules may be implemented by software, hardware, or a combination of both.

Generation module 401 may be configured to generate a plurality of snapshots of the storage system at multiple times. Clustering module 402 may be configured to cluster the plurality of snapshots into a first group of snapshots and a second group of snapshots based on data features of the plurality of snapshots. Determining module 403 may be configured to determine a clean snapshot among the plurality of snapshots based on a comparison between the generation time of the first group of snapshots and the generation time of the second group of snapshots. Herein, the clean snapshots are snapshots of the storage system that have not been subjected to a malware attack, and the damaged snapshots corresponding to the clean snapshots are snapshots that have been subjected to a malware attack.

By implementation of the functional modules of storage system 400 in this embodiment, a clean snapshot and a damaged snapshot can be automatically and quickly distinguished, thereby improving the efficiency of finding a clean snapshot and helping the user recover data quickly.

Determining module 403 may also be configured to determine data features of the snapshots based on the snapshots and the plurality of data patterns acquired. In some embodiments, the data patterns are binary bytes of a predetermined length. Determining module 403 may also be configured to, based on the average generation time of the first group of snapshots being earlier than the average generation time of the second group of snapshots, determine that the first group of snapshots are clean snapshots and the second group of snapshots are damaged snapshots; or, based on a median value of the generation time of the first group of snapshots being earlier than a median value of the generation time of the second group of snapshots, it is determined that the first group of snapshots are clean snapshots and the second group of snapshots are damaged snapshots. Clustering module 402 may also be configured to perform classification on the plurality of snapshots in response to detecting a malware attack.

Storage system 400 may further include counting module 404 configured to, in response to generation of the snapshots, count the number of each data pattern in the plurality of data patterns in the snapshots. Determining module 403 may further be configured to determine the data features of the snapshots according to the counts of the plurality of data patterns of the snapshots obtained by the counting. Storage system 400 may further include recovery module 405 configured to take a snapshot with the latest generation time in the first group of snapshots as a target snapshot. The storage system is recovered to a state corresponding to the target snapshot according to the target snapshot.

It can be understood that the specific implementation of the various functions included in the foregoing various modules may be implemented with reference to the descriptions in the foregoing other embodiments. The modules and/or units may be implemented in part or in whole as hardware modules, software modules, firmware modules, or any combination thereof. In particular, the procedure, method, or process described in some embodiments may be implemented by hardware in a storage system or a host corresponding to the storage system or another computing device independent of the storage system.

Figure 5:
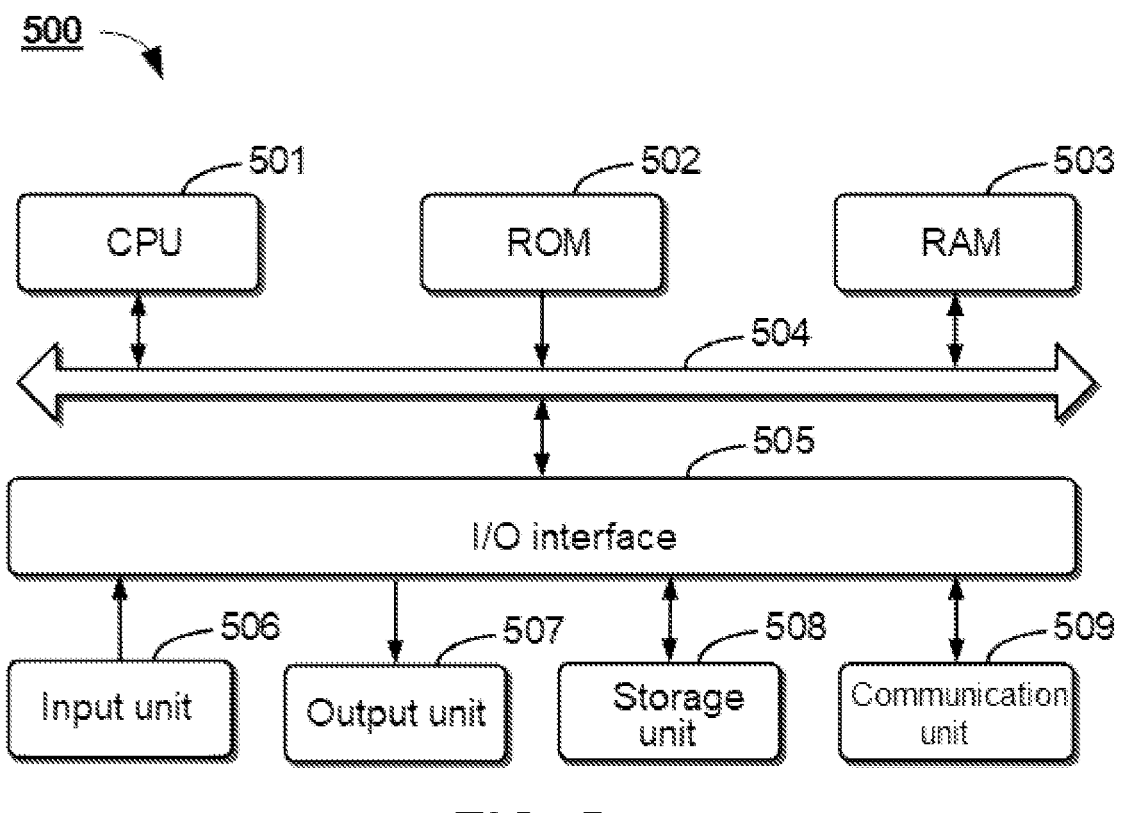
FIG. 5 shows a schematic structural diagram of a device that can be configured to implement embodiments of the present disclosure.

FIG. 5 is a schematic structural diagram of example device 500 that can be configured to implement some embodiments of the present disclosure. Device 500 may be configured to implement the above edge node or repository server. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Processing unit 501 may execute the various methods and/or processing described above, such as method 100 and system 400. For example, in some embodiments, system 400 may be implemented as a computer software program that is tangibly included in a machine-readable medium such as storage unit 508. In some embodiments, part of or all the computer program may be loaded and/or installed to device 500 via ROM 502 and/or communication unit 509. When the computer program is loaded onto RAM 503 and executed by CPU 501, one or more steps of method 100 described above may be performed. Alternatively, in other embodiments, CPU 501 may be configured to perform method 100 in any other suitable manners (e.g., by means of firmware).

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, micro-code, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the various embodiments disclosed herein.

The invention claimed is:

1. A method for snapshot classification, comprising:
generating a plurality of snapshots of a storage system at multiple times;
clustering the plurality of snapshots into a first group of snapshots having multiple snapshots and a second group of snapshots having multiple snapshots based on data features of the plurality of snapshots; and
determining a clean snapshot among the plurality of snapshots based on a comparison between the generation time of the first group of snapshots and the generation time of the second group of snapshots;
wherein determining the clean snapshot includes:
based on the average generation time of the first group of snapshots being earlier than the average generation time of the second group of snapshots, determining that the first group of snapshots are clean snapshots and the second group of snapshots are damaged snapshots; or
based on a median value of the generation time of the first group of snapshots being earlier than a median value of the generation time of the second group of snapshots, determining that the first group of snapshots are clean snapshots and the second group of snapshots are damaged snapshots; and
selecting the clean snapshot from the first group of snapshots; and
recovering the storage system to a storage state corresponding to the clean snapshot by performing a rollback operation that restores previous data access provided by the storage system.

2. The method according to claim 1, further comprising:
acquiring a plurality of data patterns; and
determining the data features of the snapshots based on the snapshots and the plurality of data patterns.

3. The method according to claim 2, wherein the data patterns are binary bytes of a predetermined length.

4. The method according to claim 2, wherein the plurality of data patterns comprise a first data pattern, a count value of the first data pattern of a first snapshot in the first group of snapshots is greater than a count value of the first data pattern of a second snapshot in the second group of snapshots, the first snapshot is a clean snapshot, and the second snapshot is a damaged snapshot.

5. The method according to claim 2, wherein determining the data features of the snapshots based on the snapshots and the plurality of data patterns comprises:
in response to generation of the snapshots, counting the number of each data pattern in the plurality of data patterns in the snapshots; and
determining the data features of the snapshots according to the counts of the plurality of data patterns of the snapshots obtained by the counting.

6. The method according to claim 1, further comprising:
taking a snapshot with the latest generation time in the first group of snapshots as a target snapshot,
the storage system being recovered to a state corresponding to the target snapshot.

7. The method according to claim 1, wherein the clean snapshots are snapshots of the storage system that have not been subjected to a malware attack, and the damaged snapshots are snapshots of the storage system that have been subjected to a malware attack.

8. The method according to claim 7, further comprising:
performing the classification on the plurality of snapshots in response to detecting the malware attack.

9. The method according to claim 1, wherein clustering the plurality of snapshots into a first group of snapshots and a second group of snapshots based on data features of the plurality of snapshots comprises:
randomly selecting feature values of data features of two of the snapshots as a first centroid of a first cluster and a second centroid of a second cluster;
performing a cyclic process until a preset condition is met, the cyclic process comprising:
calculating distances between feature values of data features of other snapshots and the first centroid and the second centroid;
for each data feature in the data features of the other snapshots, selecting a cluster corresponding to the centroid with a small distance for clustering;
calculating an average value of feature values of various data features in the first cluster obtained by clustering and an average value of feature values of various data features in the second cluster obtained by clustering; and
updating the first centroid to the average value of feature values of various data features in the first cluster obtained by clustering, and updating the second centroid to the average value of feature values of various data features in the second cluster obtained by clustering;
wherein the preset condition is that the first centroid is the same as the average value of feature values of various data features in the first cluster, and the second centroid is the same as the average value of feature values of various data features in the second cluster; and
taking the snapshots corresponding to the data features in the first cluster that meet the preset condition as the first group of snapshots, and taking the snapshots corresponding to the data features in the second cluster that meet the preset condition as the second group of snapshots.

10. The method according to claim 1, wherein selecting the clean snapshot from the first group of snapshots includes:

locating a snapshot of the first group of snapshots with a latest generation time.

11. An electronic device for snapshot classification, comprising:

a processor; and a memory coupled to the processor and having instructions stored therein, wherein the instructions, when executed by the processor, cause the electronic device to perform operations comprising:

generating a plurality of snapshots of a storage system at multiple times;

clustering the plurality of snapshots into a first group of snapshots having multiple snapshots and a second group of snapshots having multiple snapshots based on data features of the plurality of snapshots; and determining a clean snapshot among the plurality of snapshots based on a comparison between the generation time of the first group of snapshots and the generation time of the second group of snapshots; wherein determining the clean snapshot includes:

based on the average generation time of the first group of snapshots being earlier than the average generation time of the second group of snapshots, determining that the first group of snapshots are clean snapshots and the second group of snapshots are damaged snapshots; or based on a median value of the generation time of the first group of snapshots being earlier than a median value of the generation time of the second group of snapshots, determining that the first group of snapshots are clean snapshots and the second group of snapshots are damaged snapshots; and selecting the clean snapshot from the first group of snapshots; and recovering the storage system to a storage state corresponding to the clean snapshot by performing a rollback operation that restores previous data access provided by the storage system.

12. The electronic device according to claim 11, wherein the operations further comprise:

acquiring a plurality of data patterns; and determining the data features of the snapshots based on the snapshots and the plurality of data patterns.

13. The electronic device according to claim 12, wherein the data patterns are binary bytes of a predetermined length.

14. The electronic device according to claim 12, wherein the plurality of data patterns comprise a first data pattern, a count value of the first data pattern of a first snapshot in the first group of snapshots is greater than a count value of the first data pattern of a second snapshot in the second group of snapshots, the first snapshot is a clean snapshot, and the second snapshot is a damaged snapshot.

15. The electronic device according to claim 12, wherein determining the data features of the snapshots based on the snapshots and the plurality of data patterns comprises:

in response to generation of the snapshots, counting the number of each data pattern in the plurality of data patterns in the snapshots; and determining the data features of the snapshots according to the counts of the plurality of data patterns of the snapshots obtained by the counting.

16. The electronic device according to claim 11, wherein the operations further comprise:

taking a snapshot with the latest generation time in the first group of snapshots as a target snapshot, the storage system being recovered to a state corresponding to the target snapshot.

17. The electronic device according to claim 11, wherein the clean snapshots are snapshots of the storage system that have not been subjected to a malware attack, and the damaged snapshots are snapshots of the storage system that have been subjected to a malware attack.

18. The electronic device according to claim 11, wherein clustering the plurality of snapshots into a first group of snapshots and a second group of snapshots based on data features of the plurality of snapshots comprises:

randomly selecting feature values of data features of two of the snapshots as a first centroid of a first cluster and a second centroid of a second cluster;

performing a cyclic process until a preset condition is met, the cyclic process comprising:

calculating distances between feature values of data features of other snapshots and the first centroid and the second centroid;

for each data feature in the data features of the other snapshots, selecting a cluster corresponding to the centroid with a small distance for clustering;

calculating an average value of feature values of various data features in the first cluster obtained by clustering and an average value of feature values of various data features in the second cluster obtained by clustering; and updating the first centroid to the average value of feature values of various data features in the first cluster obtained by clustering, and updating the second centroid to the average value of feature values of various data features in the second cluster obtained by clustering;

wherein the preset condition is that the first centroid is the same as the average value of feature values of various data features in the first cluster, and the second centroid is the same as the average value of feature values of various data features in the second cluster; and taking the snapshots corresponding to the data features in the first cluster that meet the preset condition as the first group of snapshots, and taking the snapshots corresponding to the data features in the second cluster that meet the preset condition as the second group of snapshots.

19. A computer program product having a non-transitory computer readable medium which stores a set of instructions for snapshot classification; the set of instructions, when carried out by computerized circuitry, causing the computerized circuitry to perform a method of:

generating a plurality of snapshots of a storage system at multiple times;

clustering the plurality of snapshots into a first group of snapshots having multiple snapshots and a second group of snapshots having multiple snapshots based on data features of the plurality of snapshots;

determining a clean snapshot among the plurality of snapshots based on a comparison between the generation time of the first group of snapshots and the generation time of the second group of snapshots; and recovering the storage system to a storage state corresponding to the clean snapshot by performing a rollback operation that restores previous data access provided by the storage system;

wherein clustering the plurality of snapshots into a first group of snapshots and a second group of snapshots based on data features of the plurality of snapshots comprises:

randomly selecting feature values of data features of two of the snapshots as a first centroid of a first cluster and a second centroid of a second cluster;

performing a cyclic process until a preset condition is met, the cyclic process comprising:

calculating distances between feature values of data features of other snapshots and the first centroid and the second centroid;

for each data feature in the data features of the other snapshots, selecting a cluster corresponding to the centroid with a small distance for clustering;

calculating an average value of feature values of various data features in the first cluster obtained by clustering and an average value of feature values of various data features in the second cluster obtained by clustering; and updating the first centroid to the average value of feature values of various data features in the first cluster obtained by clustering, and updating the second centroid to the average value of feature values of various data features in the second cluster obtained by clustering;

wherein the preset condition is that the first centroid is the same as the average value of feature values of various data features in the first cluster, and the second centroid is the same as the average value of feature values of various data features in the second cluster; and taking the snapshots corresponding to the data features in the first cluster that meet the preset condition as the first group of snapshots, and taking the snapshots corresponding to the data features in the second cluster that meet the preset condition as the second group of snapshots.

20. The computer program product according to claim 19, wherein determining the clean snapshot includes:

based on the average generation time of the first group of snapshots being earlier than the average generation time of the second group of snapshots, determining that the first group of snapshots are clean snapshots and the second group of snapshots are damaged snapshots; or based on a median value of the generation time of the first group of snapshots being earlier than a median value of the generation time of the second group of snapshots, determining that the first group of snapshots are clean snapshots and the second group of snapshots are damaged snapshots; and selecting the clean snapshot from the first group of snapshots.

* * * * *